United States Patent
Park et al.

(10) Patent No.: US 11,752,935 B2
(45) Date of Patent: Sep. 12, 2023

(54) INTEGRATED GUIDANCE SYSTEM OF VEHICLE AND METHOD FOR CONTROLLING THE SAME

(71) Applicants: Hyundai Motor Company, Seoul (KR); Kia Motors Corporation, Seoul (KR)

(72) Inventors: Sung Ho Park, Seoul (KR); Dong Eun Cha, Hwaseong-Si (KR); Seung Sik Han, Hwaseong-Si (KR); Jung Wook Lim, Seoul (KR); Ki Hong Lee, Seoul (KR); Byoung Suk Ahn, Gwacheon-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 443 days.

(21) Appl. No.: 17/183,108

(22) Filed: Feb. 23, 2021

(65) Prior Publication Data

US 2022/0063493 A1  Mar. 3, 2022

(30) Foreign Application Priority Data

Sep. 3, 2020  (KR) .......................... 10-2020-0112111

(51) Int. Cl.
*B60Q 3/233* (2017.01)
*B60Q 3/217* (2017.01)
*B60Q 3/80* (2017.01)
*B60R 22/48* (2006.01)
*B60Q 9/00* (2006.01)
*G01C 21/36* (2006.01)

(52) U.S. Cl.
CPC ............. *B60Q 3/233* (2017.02); *B60Q 3/217* (2017.02); *B60Q 3/80* (2017.02); *B60Q 9/00* (2013.01); *B60R 22/48* (2013.01); *G01C 21/3626* (2013.01); *B60R 2022/4866* (2013.01)

(58) Field of Classification Search
CPC . B60Q 3/80; B60Q 3/217; B60Q 9/00; G01C 21/3626
See application file for complete search history.

(56) References Cited

U.S. PATENT DOCUMENTS

2019/0230328 A1* 7/2019 Oshima ................ H04N 9/3147

FOREIGN PATENT DOCUMENTS

| JP | 04-129854 A | 4/1992 |
|---|---|---|
| KR | 20-0374374 Y1 | 1/2005 |
| KR | 10-1509969 | 4/2015 |
| KR | 10-2017-0099188 | 8/2017 |
| KR | 10-2020-0069841 | 6/2020 |

* cited by examiner

*Primary Examiner* — Curtis B Odom
(74) *Attorney, Agent, or Firm* — MORGAN, LEWIS & BOCKIUS LLP

(57) ABSTRACT

An integrated guidance system of a vehicle, may include a sensor configured to collect vehicle information of the vehicle; a lamp configured to selectively light a point including a door or a seat in an internal space of the vehicle when emitting the light; a projector configured to display guidance information on a projection surface of the internal space of the vehicle; and a controller connected to the sensor, the lamp and the projector and configured to control whether the lamp emits the light and the lighting point according to the vehicle information, generate the guidance information for guiding a passenger of the vehicle, and provide the guidance information to the projector, and a method for controlling the same.

19 Claims, 4 Drawing Sheets ized inside the internal space of the vehicle or the seatbelt is unfastened.

INTEGRATED GUIDANCE SYSTEM OF VEHICLE AND METHOD FOR CONTROLLING THE SAME

CROSS REFERENCE TO RELATED APPLICATION

The present application claims priority to Korean Patent Application No. 10-2020-0112111, filed on Sep. 3, 2020, the entire contents of which is incorporated herein for all purposes by this reference.

BACKGROUND OF THE INVENTION

Field of the Invention

The present invention relates to an integrated guidance system that can assist entry/exit of a passenger by collecting vehicle information from a sensor of a vehicle and controlling a lamp through the vehicle information, and can provide guidance information to the passenger to guide the passenger by controlling a projector to display the guidance information on a projection surface of an internal space of the vehicle, and a method for controlling the same.

Description of Related Art

Controlling lighting in a vehicle and providing a passenger with information on travel of the vehicle are essential functions. It is general in a conventional vehicle that such functions are provided mainly for a driver, that is, information is displayed to only the driver side, or the driver side is mainly allowed to control the lighting of the vehicle except for the case where the lighting is controlled by an overhead console in the ceiling of the vehicle when individual seats requires lighting.

Meanwhile, with the recent development of autonomous vehicles, the importance of the drivers has decreased. Furthermore, the concept of a vehicle has gradually changed from a private property owned by an individual to a convenient object shared by a plurality of persons. Accordingly, it is necessary to develop a new system, which surpasses a conventional driver's seat-centered manipulation system and allows individual passengers of a vehicle to easily and conveniently manipulate the functions of the vehicle, and provides vehicle travel information to the individual passengers of the vehicle.

The items referred to as the background technologies are provided only for improvement of understanding of the background of the present invention, and it may not be construed that it is admitted that the items correspond to the conventional technology known to those skilled in the art to which various exemplary embodiments of the present invention pertains.

BRIEF SUMMARY

Various aspects of the present invention are directed to providing an integrated guidance system that allows a lamp to light a door to help a passenger get into and out of a vehicle when the passenger desires to get into and out of the vehicle, allows a lamp to light individual seats, and includes a projector to display guidance information on a floor of the vehicle to provide guidance to a seat assigned to a corresponding passenger or provide vehicle travel information such as a destination, a time to destination, and a route, and a method for controlling the same.

In accordance with an aspect of the present invention, an integrated guidance system of a vehicle includes: a sensor configured to collect vehicle information of the vehicle; a lamp configured to selectively light a point including a door or a seat in an internal space of the vehicle when emitting the light; a projector configured to display guidance information on a projection surface of the internal space of the vehicle; and a controller connected to the sensor, the lamp and the projector and configured to control whether the lamp emits the light and the lighting point according to the vehicle information, generate the guidance information for guiding a passenger of the vehicle, and provide the guidance information to the projector.

The controller may be configured to generate the guidance information through vehicle travel information including passenger information, a destination, a route, or a time to the destination.

The vehicle information may include whether the door is opened, whether the seat is occupied, whether a seatbelt is fastened, or whether surroundings of the vehicle are safe.

The lamp may include a door lamp configured to light the door, a seat lamp configured to light an individual seat, or a mood lamp configured to light all seats of the vehicle, and the lamps have light of a plurality of colors.

The door lamp may light a door which is opened when the passenger gets into or off the vehicle.

The seat lamp may light a seat assigned to the passenger among the all seats when the passenger gets into or off the vehicle, and the direction of the light of the lamp may be selectively adjusted in accordance with operation of the passenger after the passenger is accommodated in the vehicle.

The mood lamp may light all the seats when the projector displays the guidance information.

The lamp may light all the seats during an emergency situation of the vehicle, and the projector may display the guidance information on the emergency situation of the vehicle on the projection surface of the internal space of the vehicle.

The sensor may collect information on a body motion of a person, and the controller may be configured to control the lighting of the lamp according to the information related to the body motion of the person.

The vehicle may be an autonomous vehicle, and the lamp or the projector may be provided in a ceiling of the vehicle to light a floor of the vehicle or display the guidance information on the floor of the vehicle.

In accordance with another aspect of the present invention, a method for controlling the integrated guidance system of a vehicle includes: an entry guidance step of controlling the lamp to light a door which is opened when the passenger gets into the vehicle; a seating guidance step of controlling the lamp to light a seat assigned to the passenger and displaying the guidance information on the projection surface of the internal space of the vehicle by use of the projector; and an exit guidance step of controlling the lamp to light a door which is opened when the passenger gets out of the vehicle.

The seating guidance step may include: when the passenger does not wear a seatbelt or a danger is detected around the vehicle in the exit guidance step, informing the passenger of the situation by controlling the lamp to light the seat of the passenger or controlling the projector to display the guidance information on the projection surface of the interior of the vehicle.

When an emergency situation occurs after the seating guidance step, the lamp may emit light or the projector may inform the passenger of the emergency situation by displaying the guidance information, and the vehicle may be decelerated or stopped.

The integrated guidance system and the method for controlling the same of the present invention allow a lamp to light a door to help a passenger get into and out of a vehicle when the passenger desires to get into and out of the vehicle, allow a lamp to light individual seats, and include a projector to display guidance information on a floor of the vehicle to provide guidance to a seat assigned to the passenger or provide vehicle travel information such as a destination, a time to destination, and a route.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
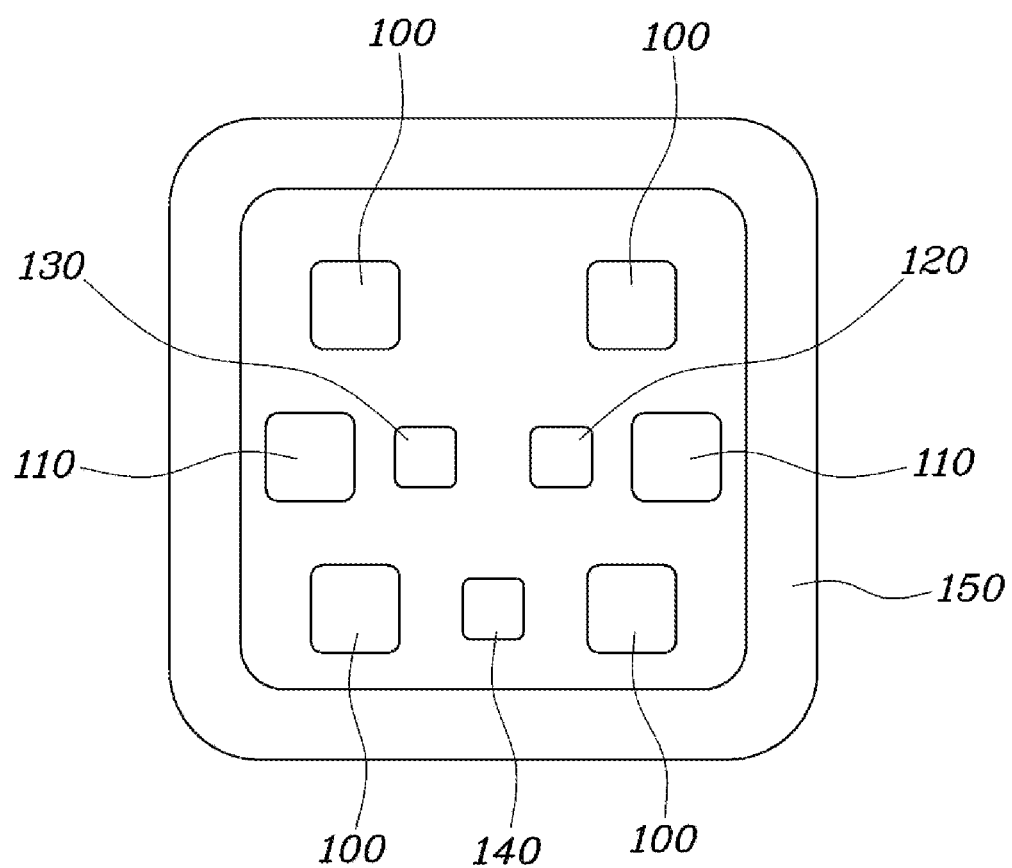
FIG. 1 is a diagram of an integrated guidance system of a vehicle according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Figure 2:
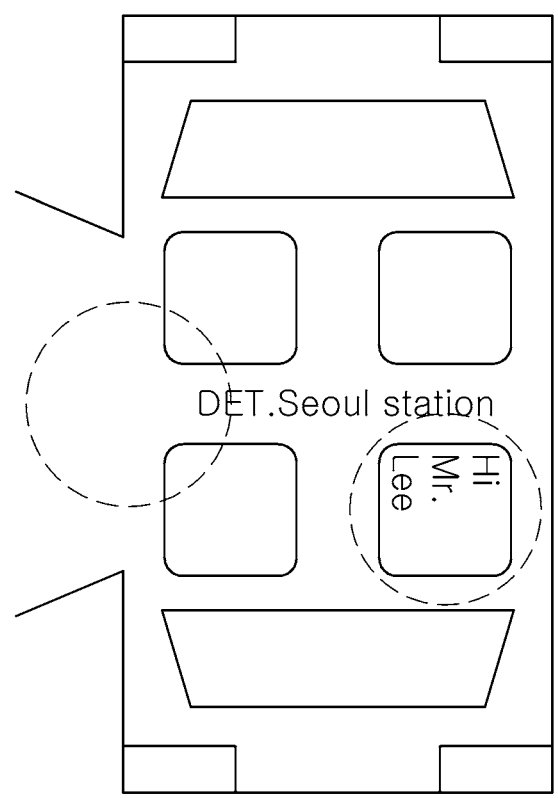
FIG. 2 is a view exemplarily illustrating a state in which a lamp is configured to light a door and a seat and a projector displays guidance information on a floor of a vehicle in the integrated guidance system of a vehicle according to the exemplary embodiment of the present invention.
Figure 3:
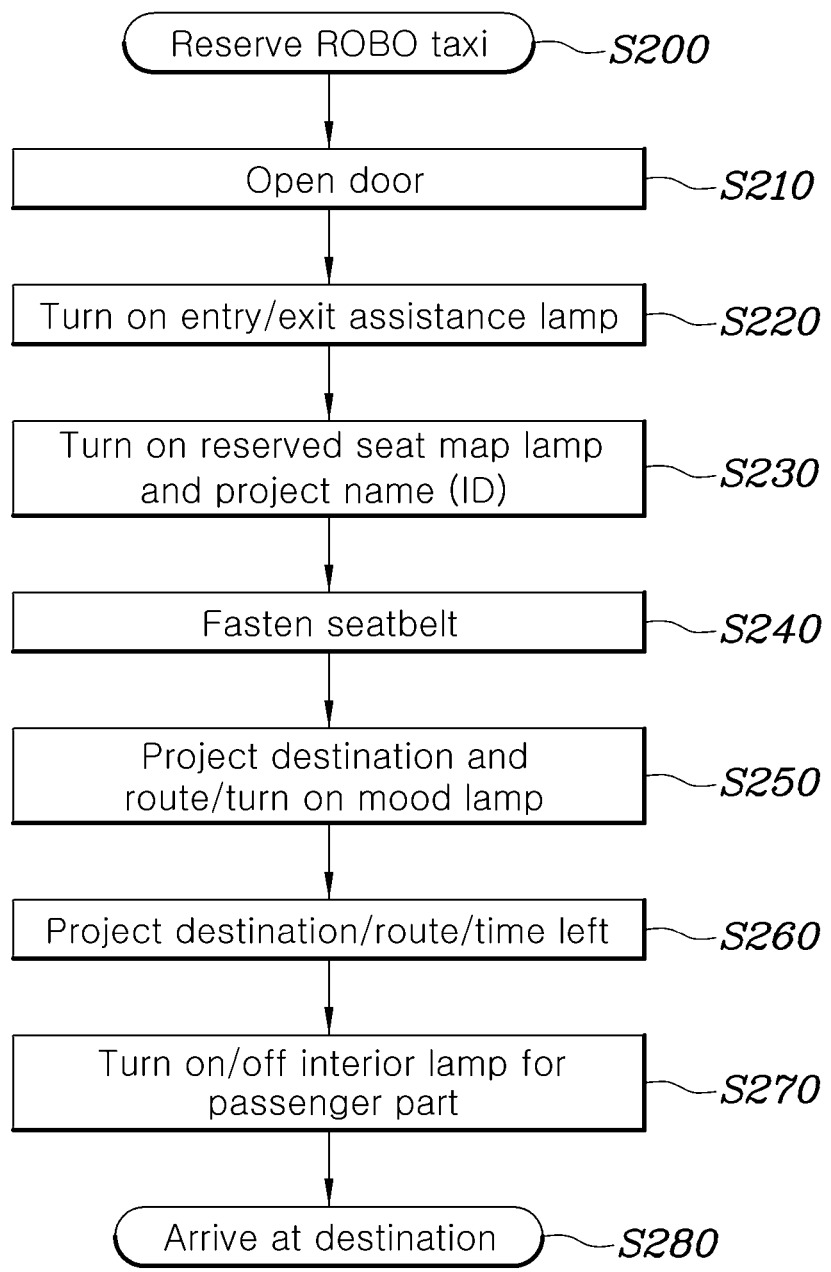
FIG. 3 is a flowchart of a method for controlling an integrated guidance system of a vehicle according to various exemplary embodiments of the present invention, when the vehicle travels to a destination after a passenger gets into the vehicle.
Figure 4:
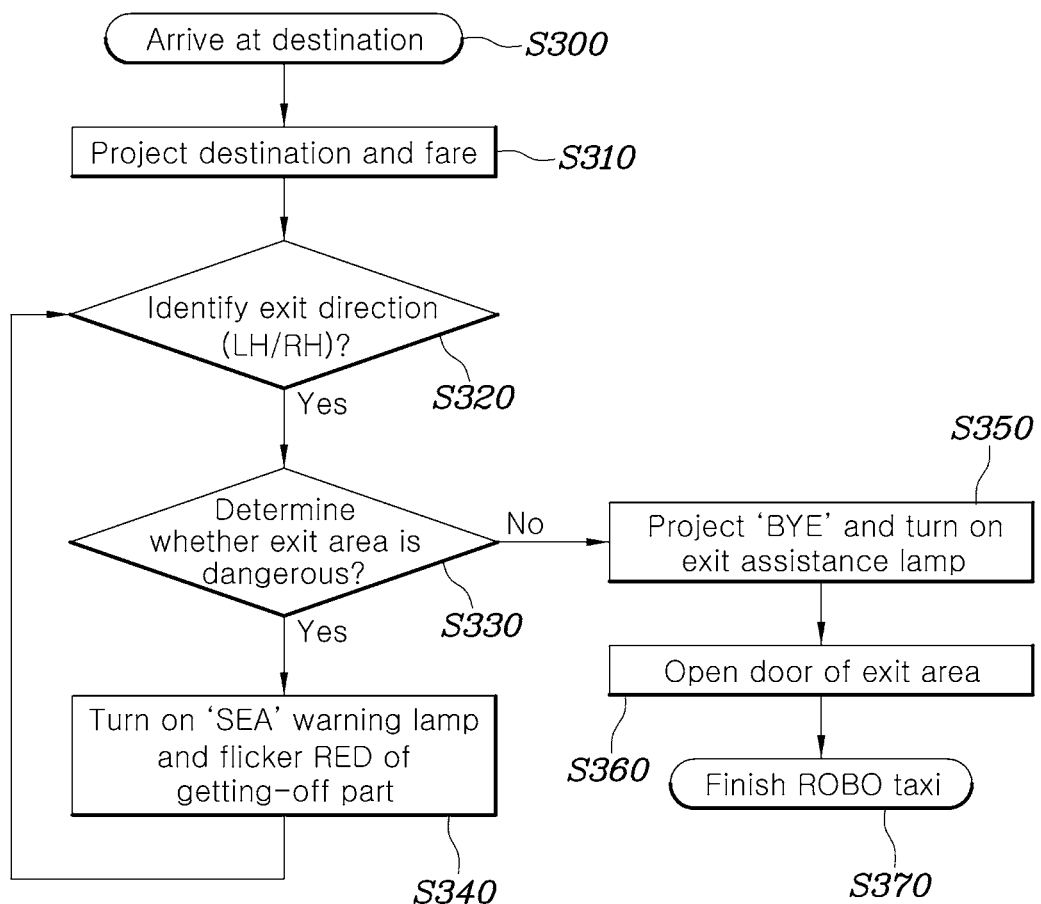
FIG. 4 is a flowchart of the method for controlling an integrated guidance system of a vehicle according to the exemplary embodiment of the present invention, when the passenger gets out of the vehicle after the vehicle arrives at the destination.

FIG. 1 is a diagram of an integrated guidance system of a vehicle according to various exemplary embodiments of the present invention. FIG. 2 is a view exemplarily illustrating a state in which a lamp is configured to light a door and a seat and a projector displays guidance information on a floor of a vehicle in the integrated guidance system of a vehicle according to the exemplary embodiment of the present invention. FIG. 3 is a flowchart of a method for controlling an integrated guidance system of a vehicle according to various exemplary embodiments of the present invention, when the vehicle travels to a destination after a passenger gets into the vehicle. FIG. 4 is a flowchart of the method for controlling an integrated guidance system of a vehicle according to the exemplary embodiment of the present invention, when the passenger gets out of the vehicle after the vehicle arrives at the destination.

FIG. 1 is a diagram of an integrated guidance system of a vehicle according to various exemplary embodiments of the present invention. FIG. 2 is a view exemplarily illustrating a state in which a lamp is configured to light a door and a seat and a projector displays guidance information on a floor of a vehicle in the integrated guidance system of a vehicle according to the exemplary embodiment of the present invention. An integrated guidance system of a vehicle according to various exemplary embodiments of the present invention includes: a sensor 130 configured to collect vehicle information of the vehicle; a lamp 100, 110, and 150 configured to selectively light a point including a door or a seat in an internal space of the vehicle when emitting the light; a projector 120 configured to display guidance information on a projection surface of the internal space of the vehicle; and a controller 140 configured to control whether the lamp emits the light and the lighting point according to the vehicle information, generate the guidance information for guiding a passenger of the vehicle, and provide the guidance information to the projector. Furthermore, the vehicle information may indicate whether the door is opened, whether the seat is occupied, whether a seatbelt is fastened, or whether surroundings of the vehicle are safe.

In detail, when the passenger has reserved the vehicle, the door of the vehicle is opened when the passenger is authenticated after the vehicle is assigned thereto (S200 and S210) in FIG. 3. In the integrated guidance system of a vehicle according to the exemplary embodiment of the present invention, when the door is opened, the sensor 130 detects the same and the lamp 110 lights the door whereby the passenger safely gets into the vehicle (S220 and S230). Thereafter, the lamp 100 lights an assigned seat to help the passenger find the seat, and the projector 120 displays the name or the ID of the passenger on the assigned seat to help the passenger find the seat assigned to him or her (S220 and S230). When the passenger is accommodated in the seat, the lamp 100 emits light or guidance information for fastening of the seatbelt is displayed on the floor of the vehicle by the projector 120 to prompt the passenger to fasten the seatbelt (S240, S250, S260 and S270).

Furthermore, after the vehicle arrives at the destination, the door is opened and the lamp 110 lights the door only when the safety of the surroundings of the vehicle are secured whereby the passenger safely gets out of the vehicle, and the projector 120 may display 'BYE' on the floor of the vehicle (S280, S300, S310, S320, and S330) in FIG. 1 and FIG. 4. When a danger is detected around the vehicle, the lamp 100 emits light or the projector 120 displays information on the danger around the vehicle on the floor of the vehicle without opening the door, whereby the passenger may be informed thereof (S350, S360, and S370) in FIG. 4.

In the integrated guidance system of a vehicle according to the exemplary embodiment of the present invention, the controller 140 may generate guidance information through vehicle travel information including passenger information, a destination, a route, or a time to the destination. Accordingly, the projector 120 displays the travel information, such as passenger information, a destination, a route, or a time to destination, on the floor of the vehicle before the vehicle starts, allowing the passenger to identify whether the destination is a desired destination, and the vehicle starts to travel when the destination is identified. Furthermore, when the destination is the desired destination, the passenger may use the vehicle after resetting the destination by use of a mobile platform, or may use another vehicle.

In the integrated guidance system of a vehicle according to the exemplary embodiment of the present invention, the lamp 100, 110, and 150 may include a door lamp 110 configured to light the door, a seat lamp 100 configured to light an individual seat, or a mood lamp 150 configured to light all seats of the vehicle, and the lamps may emit light of a plurality of colors. Because the lamps emit light of a plurality of colors, a color which is suitable for a situation, such as red, may be used.

The door lamp 110 may light the door which is opened when the passenger gets into or off the vehicle. The door lamp 110 may help the passenger safely get into or off the vehicle by lighting the door of the vehicle.

Furthermore, the seat lamp 100 may light the seat assigned to the passenger when the passenger gets into or off the vehicle, and may be controlled to selectively emit light by the passenger after the passenger is accommodated in the vehicle. A plurality of seat lamps 100 are provided to light individual seats, or one seat lamp may light the individual seats while changing the lighting point. The seat lamp 100 may be controlled for individual seats after the passenger is accommodated, and only a passenger that requires the seat lamp 100 may use the seat lamp 100 that lights his or her seat.

Meanwhile, the mood lamp 150 may light all the seats when the projector 120 displays the guidance information. The mood lamp 150 may light all the seats when all the passengers desire the same, the attention of the passenger may be called when the projector 120 displays guidance information which is required to be provided to all passenger on the floor, and the displayed guidance information may be emphasized by lighting the periphery of the displayed point.

Furthermore, in the integrated guidance system of a vehicle according to the exemplary embodiment of the present invention, the lamps 100, 110, 150 may light all the seats during an emergency situation of the vehicle, and the projector 120 may display guidance information on the emergency situation of the vehicle on the projection surface of the internal space of the vehicle. The emergency situation refers to an urgent situation, such as when the driver of the vehicle is changed, when the vehicle is an autonomous vehicle, when an autonomous mode is changed to a manual mode, when a medical emergency occurs in the vehicle or when a problem occurs in the vehicle.

For example, when a medical emergency occurs in the vehicle, the projector 120 may inform the passengers that an emergency situation occurs by displaying 'Emergency' on the floor of the vehicle and controlling the lamps 100, 110, 150 to emit red light. When the patient requires CPR, the projector 120 may display a CPR guide in the interior of the vehicle, and the lamps 100, 110, and 150 may also assist in CPR by adjusting the lighting period according to the CPR guide.

Furthermore, in the situation in which control privileges of the vehicle has to be transferred such that the passenger manually drives the vehicle in the autonomous mode as an accident occurs in the autonomous vehicle or a problem occurs in the vehicle, and in the instant case, the lamps 100, 110, and 150 may emit red light and the projector 120 may display 'Emergency', information on the transfer of the control privileges, and a method for transferring the control privileges on the floor of the vehicle to inform the passengers of the emergency situation. Thereafter, when the control privileges is transferred to a passenger who can drive the vehicle such that the vehicle is manually driven or the control privileges cannot be transferred, the vehicle may be stopped and the lamps 100, 110, and 150 may emit the red light to inform those in the surroundings of the vehicle that an emergency situation occurs.

Meanwhile, in the integrated guidance system according to the exemplary embodiment of the present invention, the sensor 130 may collect information on a body motion of a person and the controller 140 may control the lamps 100, 110, and 150 according to information on the body motion of the person. Accordingly, a gesture sensor that recognizes a body motion of a person may be used, and the integrated guidance system of a vehicle according to the exemplary embodiment of the present invention may communicate with a passenger by use of the gesture sensor, and the passenger may control the functions in the vehicle.

For example, in a process of a passenger identifying a destination after getting on the vehicle, when the passenger makes the hand gesture 'OK' meaning that the destination is a desired destination, the gesture sensor may recognize the shape of the hand the vehicle may be started, and when the passenger makes an 'X' hand gesture, the destination of the passenger may be changed and another vehicle may be assigned thereto. Furthermore, in a situation in which it is necessary to transfer the control privileges in an autonomous vehicle, the control privileges may be transferred based on the gesture made by the passenger who can drive the vehicle.

Furthermore, the passenger may manipulate the functions of the vehicle by use of the gesture sensor even when no separate touch is made in the interior of the vehicle, which can prevent infection due to contact of the many and unspecified users of a shared vehicle used, and which is advantageous from the aspect of personal sanitation of the passengers.

In the integrated guidance system of a vehicle according to the exemplary embodiment of the present invention, the vehicle is an autonomous vehicle, and the lamps 100, 110, and 150 or the projector 120 are provided in the ceiling of the vehicle, whereby the lamps 100, 110, and 150 may light the floor of the vehicle or the projector 120 may display the guidance information on the floor of the vehicle. The lamps 100, 110, and 150, the projector 120, and the controller 140 may be provided in the ceiling of the vehicle in a form of an overhead console to be easily applied to various vehicles, and may be applied to the autonomous vehicle such that the passenger may control various functions, such as lighting for individually lighting his or her seat if necessary in a vehicle having no driver, and the projector 120 may conveniently provide the guidance information to all of the passengers. Furthermore, the sensor 130 may be located in the seats or the doors, and may be mounted directly on the overhead control to recognize the passengers.

FIG. 3 is a flowchart of a method for controlling an integrated guidance system of a vehicle according to various exemplary embodiments of the present invention when the vehicle travels to a destination after a passenger gets in the vehicle. FIG. 4 is a flowchart of the method for controlling an integrated guidance system of a vehicle according to the exemplary embodiment of the present invention when the passenger gets out of the vehicle after the vehicle arrives at the destination. A method for controlling the integrated guidance system according various exemplary embodiments of the present invention includes: an entry guidance step (S220) of controlling the lamp 110 to light a door which is opened when the passenger gets in the vehicle (S200 and S210); a seating guidance step (S230) of controlling the lamp 100 to light a seat assigned to the passenger and displaying the guidance information on the projection surface of the internal space of the vehicle by use of the projector 120 (S250, S260, and S270); and an exit guidance step (S350) of controlling the lamp 110 to light the door which is opened when the passenger gets out of the vehicle (S280).

In the method for controlling an integrated guidance system of a vehicle according to the exemplary embodiment of the present invention, when the passenger does not wear the seatbelt in the seating guidance step (S240) or a danger is detected around the vehicle in the exit guidance step (S330), the lamp 100 may light the seat of the passenger, or the projector 120 may display the guidance information on the projection surface of the internal space to inform the passenger thereof.

In the method for controlling an integrated guidance system of a vehicle according to the exemplary embodiment of the present invention, when an emergency situation occurs after the seating guidance step (S230), the lamps 100, 110, and 150 may emit light, or the projector 120 may inform the passenger of the emergency situation by displaying the guidance information, and the vehicle is decelerated or stopped by the controller.

According to integrated guidance system and the method for controlling the same according to the exemplary embodiments of the present invention, an intelligent internal display for individual conveniences, lightings, and a system for manipulating the same may be provided to the many and unspecified users who use a shared autonomous vehicle such as a ROBO taxi by controlling the lamps 100, 110, and 150 or the projector 120, and infections and spread of diseases between the many and unspecified users may be prevented by providing a non-contact-type manipulation system using a gesture sensor, whereby the passenger can use the internal space in a sanitary manner.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The controller according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors.

The control device may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a controller, and the controller may be configured by a plurality of controllers, or an integrated single controller.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An integrated guidance system of a vehicle, the integrated guidance system comprising:
   a sensor configured to collect vehicle information of the vehicle;
   a lamp configured to selectively light a point including a door or a seat in an internal space of the vehicle when emitting the light;
   a projector configured to display guidance information on a projection surface of the internal space of the vehicle; and
   a controller connected to the sensor, the lamp and the projector and configured to control whether the lamp emits the light and a lighting point according to the vehicle information, to generate the guidance information for guiding a passenger of the vehicle, and to provide the guidance information to the projector.

2. The integrated guidance system of claim 1, wherein the controller is configured to generate the guidance information through vehicle travel information including passenger information, a destination, a route, or a time to the destination.

3. The integrated guidance system of claim 1, wherein the controller is configured:
to control the lamp to light a door which is opened when the passenger gets into the vehicle;
to control the lamp to light a seat assigned to the passenger and displaying the guidance information on the projection surface of the internal space of the vehicle by use of the projector; and
to control the lamp to light a door which is opened when the passenger gets out of the vehicle.

4. The integrated guidance system of claim 1, wherein when the passenger does not wear a seatbelt or a danger is detected around the vehicle, the controller is configured to inform the passenger by controlling the lamp to light the seat of the passenger or controlling the projector to display the guidance information on the projection surface of the internal space of the vehicle.

5. The integrated guidance system of claim 1, wherein when an emergency situation occurs, the controller is configured to control the lamp to emit light or the projector to inform the passenger of the emergency situation by displaying the guidance information, and to decelerate or stop the vehicle.

6. The integrated guidance system of claim 1, wherein the vehicle information includes whether the door is opened, whether the seat is occupied, whether a seatbelt is fastened, or whether surroundings of the vehicle are safe.

7. The integrated guidance system of claim 1,
wherein the lamp includes a door lamp configured to light the door, a seat lamp configured to light an individual seat, or a mood lamp configured to light all seats of the vehicle including the individual seat.

8. The integrated guidance system of claim 7,
wherein the door lamp, the seat lamp and the mood lamp emit light of a plurality of colors.

9. The integrated guidance system of claim 7, wherein the door lamp is configured to light a door which is opened when the passenger gets into or off the vehicle.

10. The integrated guidance system of claim 7, wherein the seat lamp is configured to light a seat assigned to the passenger among all the seats when the passenger gets into or off the vehicle, and a direction of the light emitted by the lamp is selectively adjusted in accordance with instruction of the passenger after the passenger is accommodated in the vehicle.

11. The integrated guidance system of claim 7, wherein the mood lamp is configured to light all the seats when the projector displays the guidance information.

12. The integrated guidance system of claim 1, wherein the lamp is configured to light all seats during an emergency situation of the vehicle, and the projector displays the guidance information on the emergency situation of the vehicle on the projection surface of the internal space of the vehicle.

13. The integrated guidance system of claim 1, wherein the sensor is configured to collect information on a body motion of a person, and the controller is configured to control lighting of the lamp according to the information related to the body motion of the person.

14. The integrated guidance system of claim 1, wherein the vehicle is an autonomous vehicle, and the lamp or the projector is provided in a ceiling of the vehicle to light a floor of the vehicle or to display the guidance information on the floor of the vehicle.

15. A method of controlling the integrated guidance system of the vehicle of claim 1, the method including:
an entry guidance step of controlling, by the controller, the lamp to light a door which is opened when the passenger gets into the vehicle;
a seating guidance step of controlling, by the controller, the lamp to light a seat assigned to the passenger and displaying, by the controller, the guidance information on the projection surface of the internal space of the vehicle by use of the projector; and
an exit guidance step of controlling, by the controller, the lamp to light a door which is opened when the passenger gets out of the vehicle.

16. The method of claim 15, wherein the seating guidance step includes:
when the passenger does not wear a seatbelt or a danger is detected around the vehicle in the exit guidance step, informing, by the controller, the passenger by controlling the lamp to light the seat of the passenger or controlling the projector to display the guidance information on the projection surface of the internal space of the vehicle.

17. The method of claim 15, wherein when an emergency situation occurs after the seating guidance step, the lamp emits light or the projector informs the passenger of the emergency situation by displaying the guidance information, and the vehicle is decelerated or stopped by the controller.

18. The method of claim 15, wherein the controller includes:
a processor; and
a non-transitory storage medium on which a program for performing the method of claim 15 is recorded and executed by the processor.

19. A non-transitory computer readable medium on which a program for performing the method of claim 15 is recorded.

* * * * *